(12) United States Patent
Ebeshu et al.

(10) Patent No.: US 6,775,741 B2
(45) Date of Patent: Aug. 10, 2004

(54) CACHE SYSTEM WITH LIMITED NUMBER OF TAG MEMORY ACCESSES

(75) Inventors: Hidetaka Ebeshu, Kawasaki (JP); Hideaki Tomatsuri, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 25 days.

(21) Appl. No.: 09/768,348

(22) Filed: Jan. 25, 2001

(65) Prior Publication Data

US 2002/0029321 A1 Mar. 7, 2002

(30) Foreign Application Priority Data

Aug. 21, 2000 (JP) ........................................ 2000-249787

(51) Int. Cl.⁷ ............................................. G06F 12/00
(52) U.S. Cl. ...................... 711/118; 711/144; 713/324
(58) Field of Search ................................ 711/118, 144; 713/324

(56) References Cited

U.S. PATENT DOCUMENTS

| | | | | |
|---|---|---|---|---|
| 4,811,209 A | * | 3/1989 | Rubinstein | 711/144 |
| 5,299,147 A | * | 3/1994 | Holst | 365/189.01 |
| 5,430,683 A | * | 7/1995 | Hardin et al. | 365/227 |
| 5,809,535 A | * | 9/1998 | Tanioka | 711/128 |
| 5,835,934 A | * | 11/1998 | Tran | 711/118 |
| 5,845,309 A | * | 12/1998 | Shirotori et al. | 711/118 |
| 5,964,884 A | * | 10/1999 | Partovi et al. | 711/167 |

OTHER PUBLICATIONS

Panwar et al. "Reducing the frequency of tag compares for low power I-cache design", 1995 Intl. Symposium on Low Power Design, Dana Point CA 1995, p. 57–62.*
Handy, "The Cache Memory Book", 1998 Academic Press, Second Edition pp. 8–15, 20, 47–48.*

* cited by examiner

Primary Examiner—Mano Padmanabhan
Assistant Examiner—Paul Baker
(74) Attorney, Agent, or Firm—Staas & Halsey LLP (57) ABSTRACT

The present invention is a cache system comprising a data memory for storing data in an external memory, and a tag memory for storing address information for data held in the data memory and a valid data bit indicating whether data controlled by the address information is valid; wherein the address information in the tag memory commonly controls a plurality of data items with consecutive addresses; wherein reading from tag memory is prohibited in a case where an address to be accessed corresponds to data controlled by address information in tag memory that matches a preceding address to be accessed; and wherein tag memory is read and a cache hit determination is performed in a case where the address to be accessed corresponds to data controlled by address information in tag memory that does not match the preceding address to be accessed.

19 Claims, 9 Drawing Sheets

| Case | | PLS4 | S Line | TRCancel | THit2 |
|---|---|---|---|---|---|
| 1 | Prohibit from Reading TAG memory | H(1) (Increment) | H(1) | H(1) | H(hit) |
| 2 | Read TAG memory to determine cache hit | H(1) (Increment) | L(0) | L(0) | THit |
| 3 | | L(0) Jump | — | L(0) | |

| Case | | TRCancel | THit2 |
|---|---|---|---|
| 1 | TAG memory read is prohibited if access is within the same TAG memory control range. | H | H(hit) |
| 2 | TAG memory is read and hit determination is performed if access is to the different TAG memory control range. | L | THit |

CACHE SYSTEM WITH LIMITED NUMBER OF TAG MEMORY ACCESSES

BACKGROUND OF THE INVENTION

1. Field of the Invention

The present invention relates to a cache system in a CPU, and more particularly to a cache system that can reduce the number of accesses to a tag memory used for detecting cache hits.

2. Description of the Related Art

CPUs generally contain a cache system. Main memory wherein are stored programs and data (hereinafter referred to as "data") is provided external to the CPU, but access from the CPU to the external main memory is slow. Once the external main memory is accessed, the data stored therein are also stored in a cache memory within the CPU. When the same address is next accessed, the data stored in cache memory are used without the external main memory being accessed. The frequency of access from the CPU to the external main memory is thereby reduced and CPU performance can be improved.

In addition to data memory for storing data from the external memory, the cache system includes tag memory for storing an address whose data is stored in the data memory. When data access is generated by CPU, a cache hit determination is performed within the CPU, wherein the address data in the tag memory are read and it is determined whether that address data match the address to be accessed. If the address data read from tag memory match the address to be accessed and a valid data-indicating flag in the tag memory is valid, this is determined to be a cache hit. Then, Data within the internal data memory are read and the external main memory is not accessed. On the other hand, if the address data read from tag memory do not match the address to be accessed or the valid data-indicating flag in the tag memory is invalid, this is determined to be a cache miss. Then, the external main memory is accessed, those data are stored in the internal data memory, and the address information and valid data-indicating flag are stored in the tag memory. The address information within the tag memory is also called the address tag and an upper address is stored in the tag memory identified by a lower address. In addition to this address tag, a valid data bit indicating whether that address tag is valid is stored within the tag memory.

As discussed above, the tag memory within the CPU is accessed upon each memory access and a cache determination is performed. Meanwhile, in order for speed, a high-speed memory such as SRAM is used for the tag memory and data memory provided in the cache system. Consequently, considerable power is consumed by each tag memory access. This type of power consumption becomes a problem that cannot be ignored when the CPU is installed in a portable telephone or portable information terminal.

SUMMARY OF THE INVENTION

It is an object of the present invention to provide a cache system that can reduce the number of accesses to tag memory.

It is another object of the present invention to provide a cache system that can reduce the number of tag memory read operations.

It is another object of the present invention to provide a cache system that can reduce power consumption.

In order to achieve the abovementioned objects, a first aspect of the present invention is a cache system comprising a data memory for storing data in an external memory, and a tag memory for storing address information for data held in the data memory and a valid data bit indicating whether data controlled by the address information is valid; wherein the address information in the tag memory commonly controls a plurality of data items with consecutive addresses; wherein reading from tag memory is prohibited in a case where an address to be accessed corresponds to data controlled by address information in tag memory that matches a preceding address to be accessed; and wherein tag memory is read and a cache hit determination is performed in a case where the address to be accessed corresponds to data controlled by address information in tag memory that does not match the preceding address to be accessed.

In the case where the tag memory address information commonly controls a plurality of data items with consecutive addresses, one item of address information within tag memory is used for the plurality of data items in common. Consequently, in the event of a request to access the address for the plurality of data items controlled by one item of address information in tag memory, tag memory is read and a cache hit determination is performed upon the first access of an address within that range of control. In the event of a subsequent request to access an address in the same range of control, however, tag memory is not read again because the address information within tag memory is the same as the preceding access. As a result, the number of redundant readings of tag memory can be reduced.

In the case of tag memory commonly controlling the abovementioned plurality of data items, there are a first and second constitution: in the first constitution the valid data bit comprises one bit and a plurality of data items are written collectively to the internal data memory from the external memory in the case of a cache miss; and in the second constitution the valid data bit comprises a plurality of bits (for example, the same number of bits as the plurality of data items), and in the case of a cache miss only the data items requested for access are written to the internal data memory from the external memory and corresponding valid data bits are updated.

In the case of the first constitution, tag memory is read and a hit determination is performed upon the first access to an address within the range of control of one item of address information within tag memory. Upon subsequent accesses to addresses within the same range of control, however, a cache hit is forcibly determined without reading tag memory and the corresponding data in the internal data memory are accessed because the plurality of corresponding data are already written to the internal data memory regardless of the abovementioned hit determination.

In the case of the second constitution, tag memory is read and a hit determination is performed upon the first access to an address within the range of control of one item of address information within tag memory; at the same time, the corresponding valid data bit is stored. Upon subsequent accesses to addresses within the same range of control, the hit determination is performed according to the valid data bit that was stored and without reading tag memory. At a cache hit, corresponding data within the internal data memory is accessed. At a cache miss, corresponding data in external memory is accessed, the accessed data is written to the internal data memory, and at the same time the valid data bit is updated to the valid state. Also, during the abovementioned cache miss, access to the internal memory is stopped.

In order to achieve the abovementioned objects, another aspect of the present invention is a cache system comprising:

a data memory for holding a part of data stored in an external memory; a tag memory for holding address information for data held in the data memory and a valid data bit indicating whether data controlled by the address information is valid, in which the address information commonly controls a plurality of data items with consecutive addresses; and a cache controller that prohibits reading of the tag memory in a first case where an address to be accessed corresponds to data controlled by the same address information in tag memory as that for the preceding address to be accessed, and that allows reading of the tag memory and performs a cache hit determination in a second case where the address to be accessed corresponds to data controlled by different address information in tag memory from that for the preceding address to be accessed.

For the second and subsequent accesses of the plurality of data items controlled by the same address information in tag memory, the operation for reading tag memory is omitted and power consumption can therefore be decreased.

In a more preferable embodiment of the invention, the valid data bit comprises one bit in common to the plurality of data items; and the cache controller, in the second case, transfers the plurality of data items to be accessed in block from the external memory to the data memory, upon determining a cache miss in the cache hit determination, and the cache controller, in the first case, determines a cache hit regardless of the address information and accesses the data at the address to be accessed in the data memory.

In the case where a plurality of data items are commonly controlled by address information in tag memory and that plurality of data items is transferred in block to data memory, a cache hit can be determined without reading tag memory for the second and subsequent accesses to the same tag memory.

In a more preferable embodiment of the information, the valid data bit comprises a plurality of bits corresponding to the plurality of data items; and the cache controller, in the second case, transfers a part of the plurality of data items at the address to be accessed from the external memory to the data memory and updates the corresponding valid data bit upon determining a cache miss in the cache hit determination and the cache controller, in the first case, determines a cache hit according to the valid data bit.

In a case where a plurality of data items are commonly controlled by address information in tag memory and the validity of that plurality of data items is controlled individually with the valid data bit, the cache hit determination can be performed according to the valid data bit and without reading tag memory for the second and subsequent accesses.

DESCRIPTION OF THE PREFERRED EMBODIMENTS

The preferred embodiments of the present invention are explained below with reference to the drawings. However, these embodiments in no way limit the technical scope of the present invention.

Figure 1:
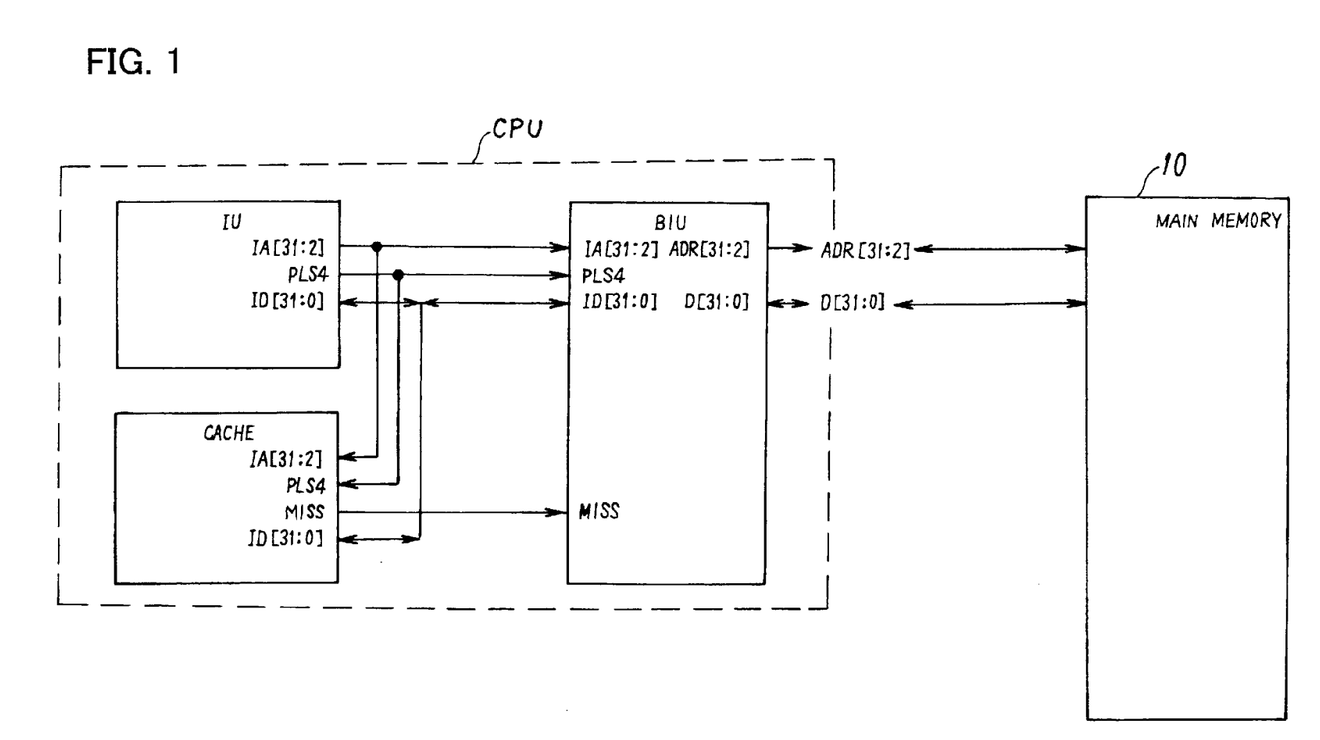
FIG. 1 is a system block diagram relating to an embodiment.

FIG. 1 is a system block diagram of an embodiment. The CPU is connected to the external main memory 10 by an external address bus ADR and an external data bus D. In the example in FIG. 1, the external data bus D is a 32 bit bus and the external address ADR is a 30 bit bus. Because the data is in a 32 bit, 4 byte configuration, the least significant two bits ADR [1:0] of the external address ADR are not used.

The CPU contains an integer unit IU such as an arithmetic circuit, a cache system CACHE, and a bus interface unit BIU. The integer unit IU outputs an address to an internal address bus IA and requests access to memory. In response to this access request, the cache system CACHE checks whether the data to be accessed are held in an internal data memory therein and if those data are present, accesses the internal data memory and reads or writes through the internal data bus ID. On the other hand, if those data are not present, the cache system CACHE supplies a cache miss signal MISS to the bus interface unit BIU and requests access to the external main memory 10. In response to this access request, the bus interface unit BIU accesses the main memory 10, reads the data to be accessed, writes the data to the data memory in the cache system CACHE, and updates an address information in tag memory.

Moreover, the integer unit IU generates a signal PLUS4 indicating whether the address to be accessed is merely an incrementation of the preceding address.

Figure 2:
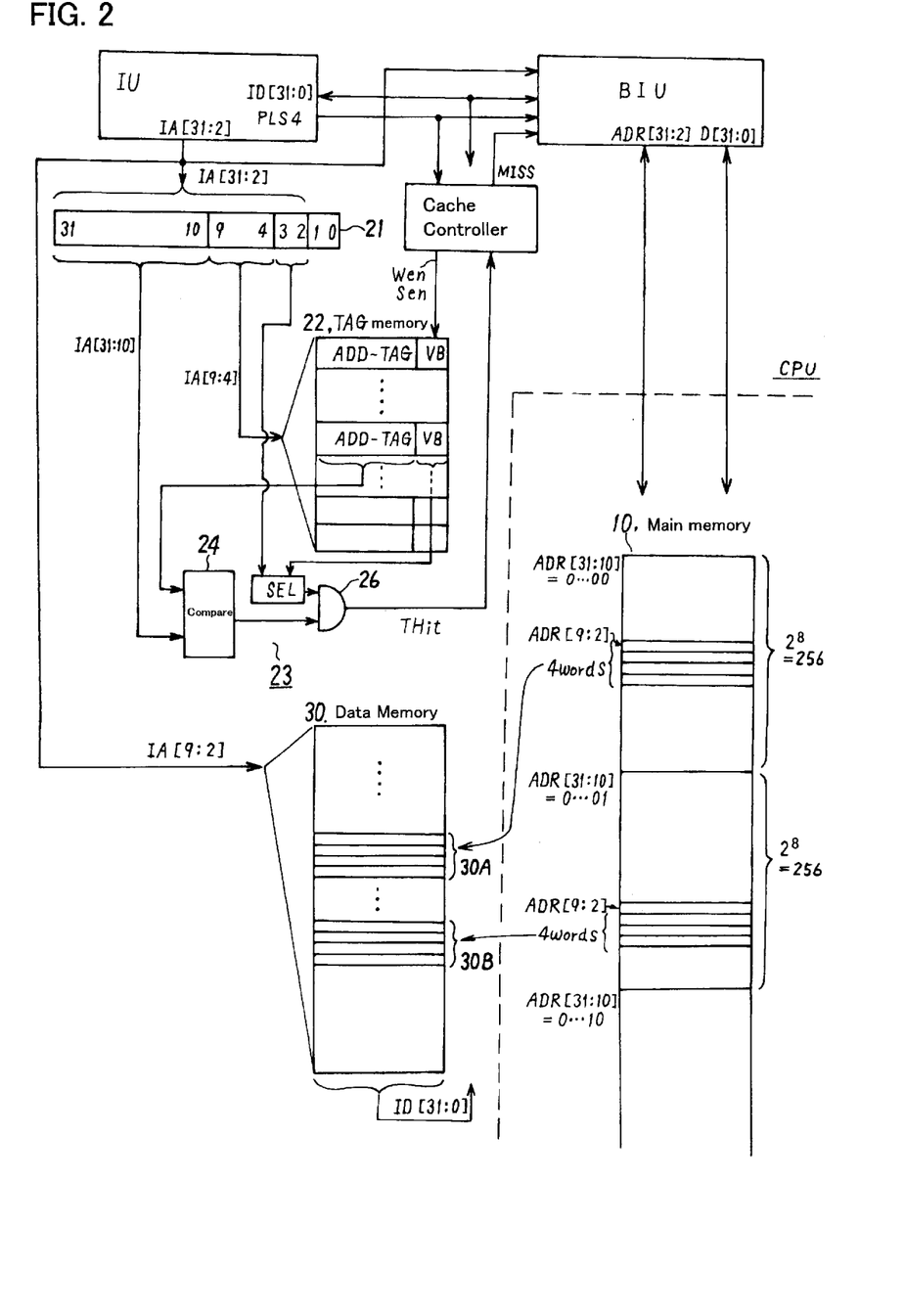
FIG. 2 is a drawing showing the constitution of the cache system in FIG. 1.

FIG. 2 is a drawing showing a configuration within the cache system in FIG. 1. The cache system contains tag memory 22, data memory 30, and the cache controller 20 for determining cache hits and controlling access to tag memory and data memory. In FIG. 2, a cache hit determining portion 23 is specifically indicated, but this cache determining portion 23 is established within the cache controller 20.

Address information for data held in the internal data memory 30 are stored in the tag memory 22. As shown in the address table 21, the internal address IA [31:2] is divided into upper bits IA [31:10], middle bits IA [9:4], and lower bits IA [3:2]; the lowest two bits IA [1:0] are not present. The middle bits IA [9:4] are used as address for the tag memory 22. Consequently, the tag memory 22 has a capacity of $2^6=64$ lines. In each line of tag memory, the upper address IA [31:10] of the address of the data stored in data memory 30 is stored as the address information ADD-TAG in the line for the middle address IA [9:4]. Furthermore, the valid data bit VB, indicating whether the plurality of data items controlled by that address information ADD-TAG is actually held in data memory 30, is stored in each line of the TAG memory.

Hit determination is then performed by accessing the tag memory 22 according to the middle address IA [9:4] of the address to be accessed and by comparing the address information ADD-TAG comprising the upper address IA [31:10] stored in that middle address to the upper address IA [31:10] of the address to be accessed using the comparator 24. The logical product of the output of the comparator 24 and the valid data bit VB is generated as the hit determination signal THit. By holding the upper address IA [31:10] for data stored in data memory 30 at the decoded position of its middle address IA [9:4] in tag memory, it becomes possible to reduce the volume of the tag memory 22 and perform the hit determination for the data memory 30 at high speeds.

Furthermore, the address information ADD-TAG for each line of the tag memory 22 commonly controls a plurality of data items with consecutive addresses. In the example in FIG. 2, four data with consecutive addresses are commonly controlled by a single item of address information ADD-TAG. As shown in FIG. 2, the external main memory 10 is divided into data groups specified by the upper address ADR [31:10]. Each data group contains $2^8=256$ words of data specified by the middle and lower addresses ADR [9:2]. The data groups of four words specified by the middle address ADR [9:4] in those 256 words are transferred to the data memory 30 in the cache system and collectively controlled by the tag memory 22.

The data memory 30 has a capacity of 256 words that can be specified by the middle and lower addresses ADR [9:2]. In other words, of the plurality of groups of four words of data specified by the middle address ADR [9:4] in the external main memory 10, one group of four words of data 30A, 30B is written to the data memory 30. The 256 word data group with which those four words of data are affiliated is specified by the upper address ADR [31:10] and stored in the tag memory 22 as the address information ADD-TAG.

In addition to the address information ADD-TAG for controlling the data held in the data memory 30, the tag memory 22 also contains the valid data bit BV for indicating the validity of the contents of the data memory which is controlled by that address information ADD-TAG. This valid data bit BV may be a single bit or may be four bits in order to indicate the validity of four words of data individually.

In the case where the valid data bit VB is one bit, the four words of data 30A, 30B are in a group (in a block) transferred from or sent to the main memory 10. Consequently, when the valid data bit VB is valid, this indicates that all four words of data are actually held in the data memory 30. If invalid, this indicates that all four words of data are not held in the data memory 30. In the case where the valid data bit VB is one bit, the selector SEL within the hit determining portion 23 in FIG. 2 is not necessary.

In the case where the valid data bit VB is four bits, the four words of data 30A, 30B are transferred or sent one word at a time from or to the main memory 10. Consequently, when the valid data bit VB is "1111", this indicates that the four words of data specified by the middle address ADR [9:4] are all held in the data memory 30. When the valid data bit VB is "0001", this indicates that only the first of the four words of data is held within the data memory 30.

Generally, in a cache system, the upper address of the data in the data memory is stored at a position determined by decoding the lower address thereof in the tag memory, so that it becomes possible to reduce the volume of the tag memory and make cache determinations at high speeds. However, it is not possible to hold a plurality of four word data groups having the same lower address ADR [9:2] at the same time in the data memory 30; therefore the cache hit rate sometimes drops. In order to avoid this, the abovementioned tag memory and data memory are established in multiple sets. Management of these multiple sets is effected by a way architecture. An explanation thereof is omitted here.

In a conventional cache system, every time the integer unit IU generates an internal address IA [31:2] and outputs data access requests, the tag memory 22 is read and hit determination is effected by the hit determining portion 23. A high-speed memory such as SRAM is used for the tag memory 22 and the operation of reading the tag memory 22 consumes a large amount of power.

As discussed above, however, the address information ADD-TAG on one line in the tag memory 22 collectively controls four words of data 30A, 30B. Consequently, when the four words of data are accessed in order, the address information ADD-TAG (upper address IA [31:10]) read from the tag memory 22 is the same each time and the output of the comparator 24 in the hit determining portion 23 indicates this agreement every time. Or, if access is within the range (four words of data) controlled by the same address information in tag memory, the address information read from tag memory becomes the same and the output of the comparator 24 is also the same.

In the present embodiment, in the case where the address to be accessed corresponds to data controlled by address information within tag memory that is the same as the previous address to be accessed, reading of the tag memory 22 is prohibited. Also, in the case where the address to be accessed corresponds to data controlled by the address information within tag memory that is different from the previous address to be accessed, the tag memory 22 is read and cache hit determination is performed. It thereby becomes possible to eliminate redundant readings of the tag memory 22 as in the prior art. It also becomes possible to reduce the access frequency of the tag memory 22 and to reduce power consumption.

Figure 3:
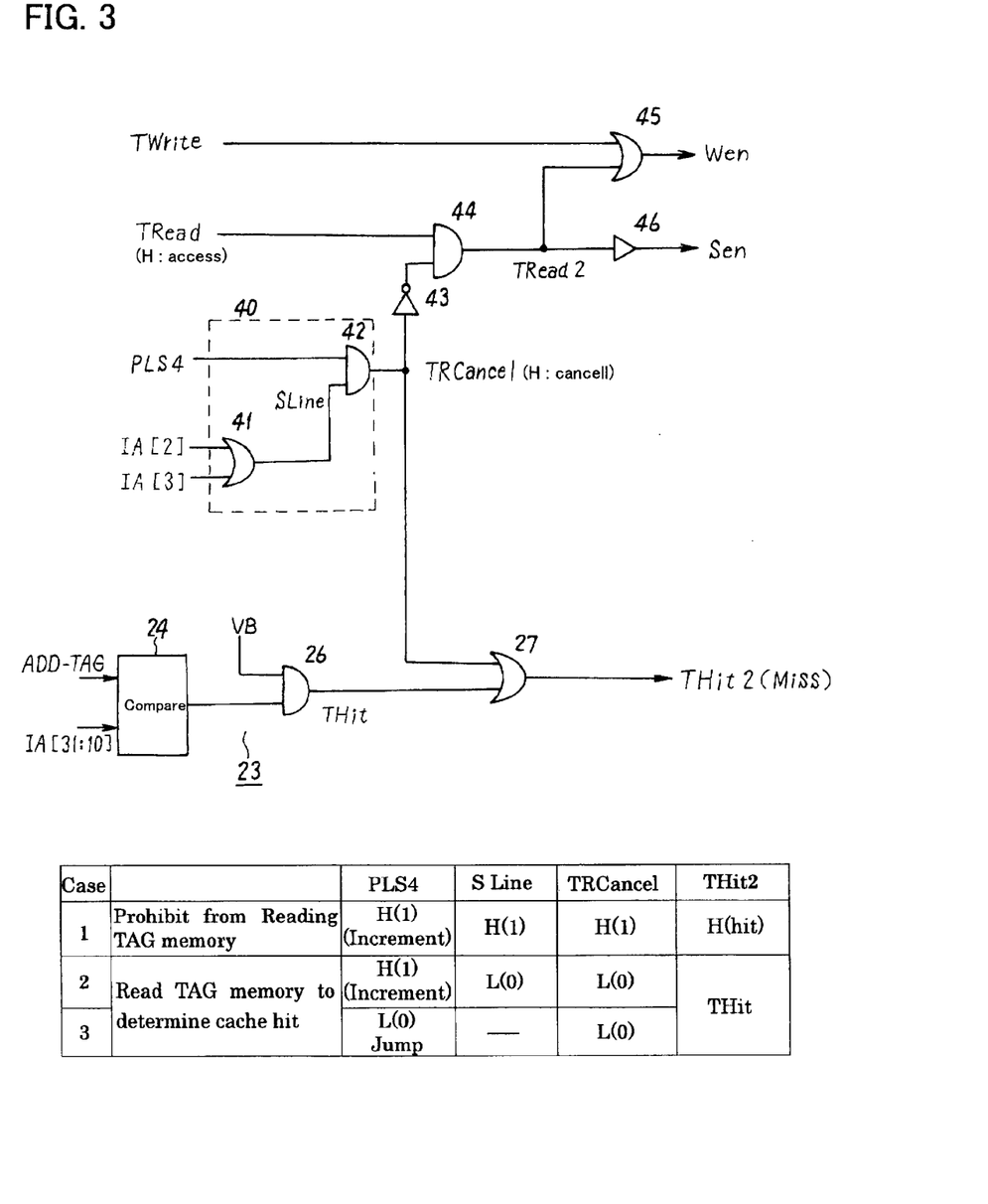
FIG. 3 is a drawing showing the cache controller relating to a first embodiment.

FIG. 3 is a drawing showing the cache controller in the first embodiment. The operation of the cache controller is shown with the table in the drawing. This is an example wherein the valid data bit VB in tag memory is one bit and the four words of data 30A, 30B are transferred from and sent to the external memory at the same time. In the first embodiment, the determination of whether the address to be accessed corresponds to the data controlled by the address information in tag memory that is the same as the previous address to be accessed is performed with the determining circuit 40. The determining circuit 40 comprises a logical sum [OR] gate 41 for the internal address IA [3:2] and a logical product [AND] gate 42 for the output of that gate 41 and the address increment signal PLUS4 supplied from the integer unit IU.

The internal address IA [3:2] specifies any of the four words of data (address 0, 4, 8, c). Consequently, the output SLine of the logical sum 41 of the internal address IA[3] and IA[2] becomes 0 when IA[3:2]=00 (address is 0); the output SLine becomes one when IA [3:2]=01 (address 4), 10 (address 8), 11 (address c). In effect, in the case where the addresses are incremented while being accessed in order, the output SLine of the logical sum gate 41 becomes 0 for the leading data (address 0) of the four words of data and the output SLine becomes one for the data thereafter (address 4, 8, c).

Consequently, in the case where the address to be accessed increments the previous address (PLUS4=1) and the address to be accessed is any of the addresses 4, 8, c of the four words of data (not the leading address), the output of the logical product gate 42 becomes 1 (high level) and the determining circuit 40 generates the tag memory read prohibiting signal TRCancel (H level). In effect, in this case, the reading of tag memory is prohibited by the tag memory read prohibiting signal TRCancel because access is within the range of control of the same address information in tag memory as the preceding accrress. Meanwhile, in the case where the address to be accessed is the address 0 of the four words of data and even if the address is incremented (PLUS4=1), the determining circuit 40 finds that this is a new access within the range of control of different address information in tag memory and the tag memory read prohibiting signal TRCancel becomes low level. As a result, reading of tag memory is allowed. In the case where the address is not incremented (PLUS4=0), the determining circuit 40 has the tag memory read prohibiting signal TRCancel become low level because there is a high probability of the access outside the range controlled by the same address information in tag memory.

In the present embodiment, according to the tag memory read prohibiting signal TRCancel generated by the determining circuit 40, the tag memory read signal TRead with H level generated during access is made low level with the AND gate 44. According to the newly generated second tag memory read signal TRead2, the word line enable signal Wen for the tag memory 22 and the sense amplifier enable signal Sen are generated through the NOR gate 45 and buffer 46. Also, the tag memory write signal TWrite at the time of a cache miss generates the word line enable signal Wen for tag memory regardless of the second tag memory read signal TRead2.

When the tag memory read prohibiting signal TRCancel is high level, since the reading of the tag memory 22 is not performed, therefore the hit determination output THit from the hit determining portion 23 becomes low level (miss hit state). According to H level of the prohibiting signal TRCancel, however, the newly generated hit determining signal THit2 is forced into the hit state (high level) through the NOR gate 27. As result, the cache controller outputs data from the inside data memory 30 and supplies it to the integer unit by a circuit, not shown. Meanwhile, according to a signal MISS indicating the hit state, the bus interface unit BIU does not access the external memory 10.

Figure 4:
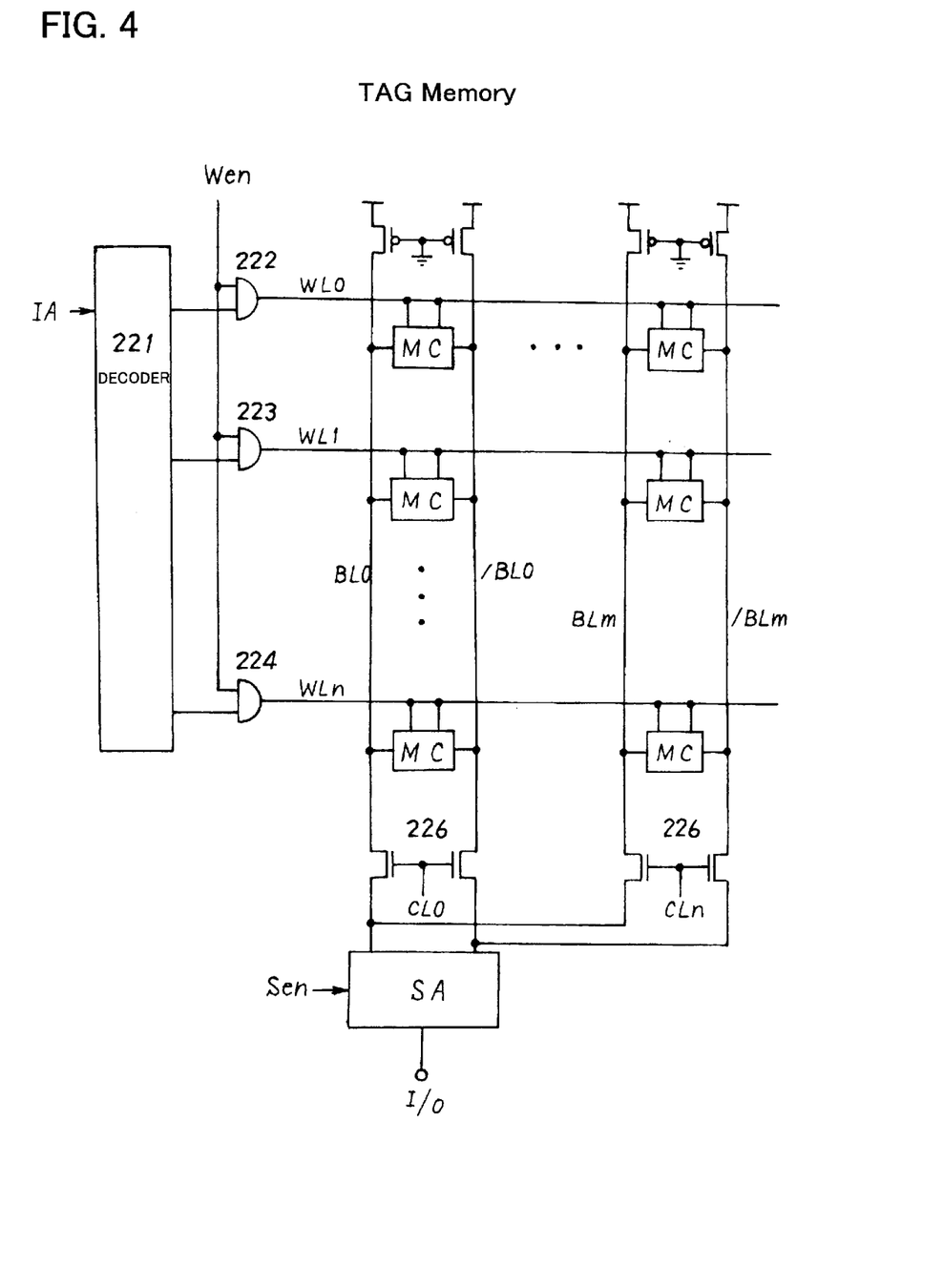
FIG. 4 is a drawing showing an example of the tag memory 22.

FIG. 4 is a drawing showing an example of the tag memory 22. FIG. 4 is an example of SRAM. Memory cells MC are disposed at the intersections of a plurality of word lines WL0, 1 . . . n and a plurality of bit line pairs BL0, /BL0–BLm, /BLm. The word lines WL are driven by the logical sum gates 222, 223–224 of the output of the word decoder 221 and the word line enable signal Wen generated by the cache controller. Consequently, when the word line enable signal Wen is low level, the word lines are not driven and the memory cells are not connected to the bit line pairs. Also, the bit line pairs BL, /BL are connected to the sense amplifier SA through the column gates 226, 227; the sense amplifier SA is activated by the sense amplifier enable signal Sen.

In the operation of SRAM, when the word line WL is driven, the memory cells MC are connected to the bit line pairs and drive to low level one of the bit line pairs precharged at high level. The state of that bit line pair is detected by the sense amplifier SA. Consequently, a large amount of current is consumed by driving the word lines and driving the sense amplifier.

According to the tag memory read prohibiting signal TRCancel, the cache control circuit discussed above maintains the abovementioned word line enable signal Wen and sense amplifier enable signal Sen in an inactive state to prohibit the read operation for tag memory regardless of the read request signal Tread.

The data memory 30 has the same circuit constitution as the tag memory in FIG. 4. Consequently, by stopping the driving of the sense amplifier enable signal to the data memory 30 at the time when a cache miss determination is made, useless read operations of the data memory 30 can also be eliminated and power consumption can be further reduced.

Figure 5:
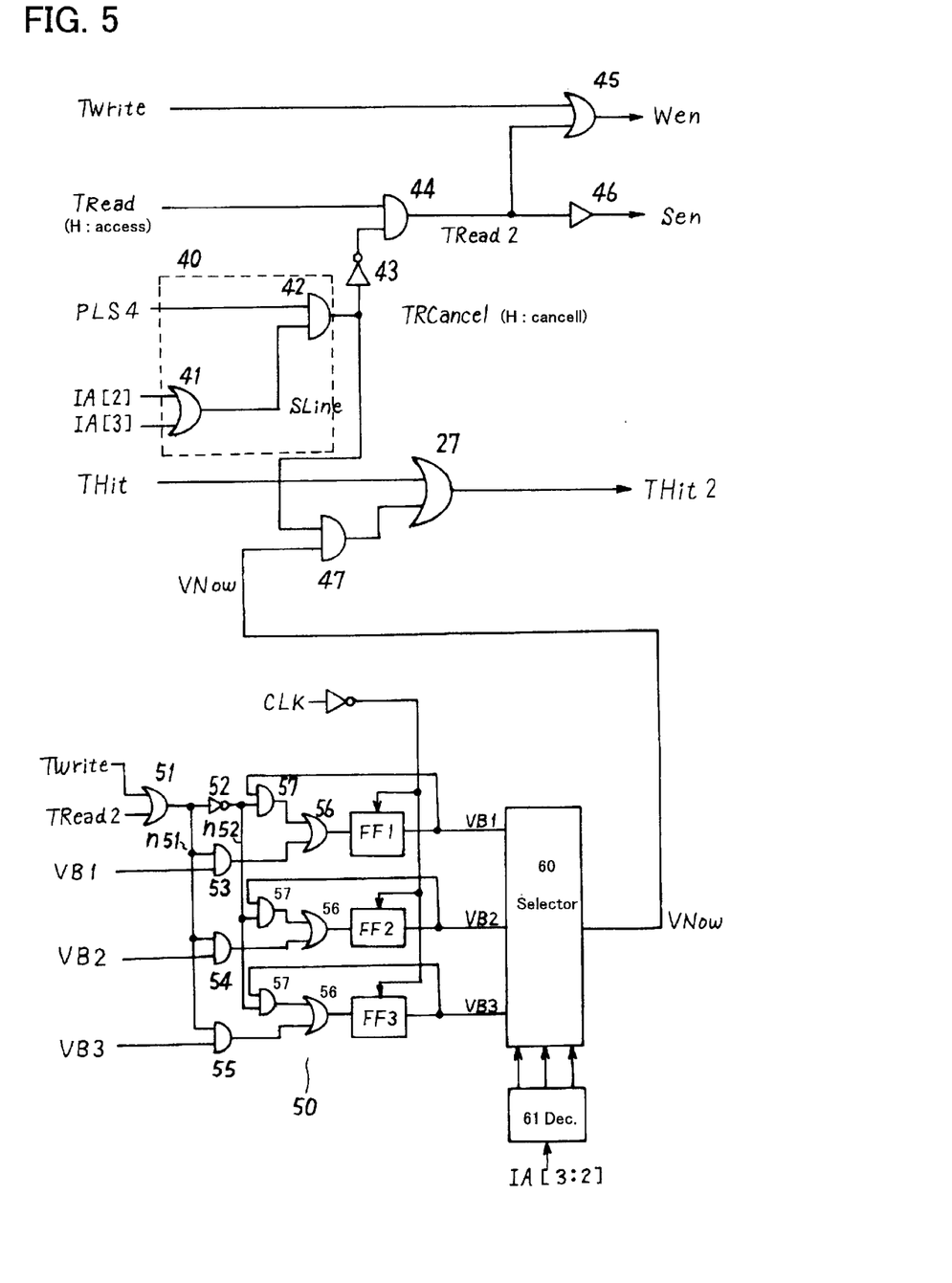
FIG. 5 is a drawing showing the cache controller relating to a second embodiment.

FIG. 5 is a drawing showing the cache controller in a second embodiment. The same references are used for portions identical to FIG. 3. In the second embodiment, the valid data bit comprises four bits and indicates whether each of four words of data are actually stored in the data memory.

In the example in FIG. 5, like the example in FIG. 3, the tag memory read prohibiting signal TRCancel is generated by the determining circuit 40; a new read signal TRead2 is generated so as to prohibit the read operation of the tag memory. In the example in FIG. 5, however, the four words of data controlled by the same address information in tag memory are initially accessed. When the tag memory 22 is read, the valid data bit holding portion 50 holds the valid data bits VB1, 2, 3 in the four bit valid data bit VB0–3, corresponding to addresses 4, 8, c in flip-flops FF1, 2, 3 respectively. In other words, when the second tag memory read signal TRead2 is high level (read state), the three valid data bits VB1, 2, 3 are held in the flip-flops FF1, 2, 3 respectively via the NOR gate 56 according to the output n51 (=H) of the NOR gate 51 through the AND gates 53, 54, 55. Afterwards, the output of each flip-flop passes through the AND gate 57 according to the signal n52 (=H) and is stored in the flip-flop once more.

The valid data bit holding portion 50 holds the valid data bits VB1–3 according to the tag memory write signal TWrite (=H) during a cache miss as well. As a result, the status following the update of the valid data bits after a cache miss is held in the valid data bit holding portion 50.

The valid data bits VB1, 2, 3 held in the valid data bit holding portion 50 are selected by the selector 60 according to the signal of the decoded internal address IA[3:2] and the valid bit signal VNow of the current address to be accessed is output.

Figure 6:
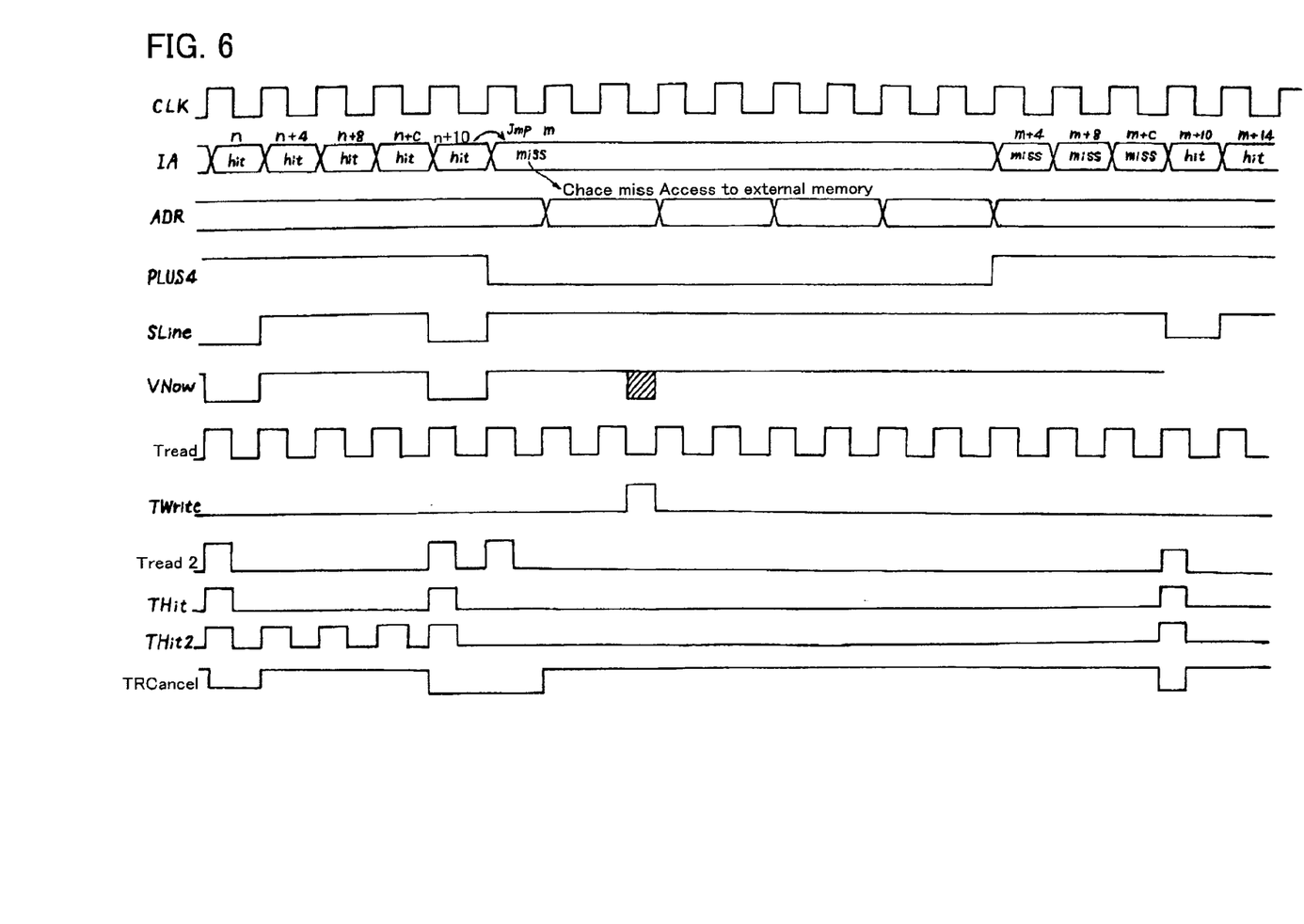
FIG. 6 is a timing chart for the second embodiment.

FIG. 6 is a timing chart for the second embodiment. The operation of the cache controller in FIG. 5 is explained with reference to FIG. 6. In the example in FIG. 6, the internal address IA is incremented as n, n+4, n+8, n+c, n+10; it next jumps to m and is then incremented as m+4, m+8, m+c, m+10.

Initially, in the case where the internal address IA is incremented (PLUS4=H) and that address is then address, access is to data controlled by different address information in tag memory. Consequently, the signal SLine becomes low level and the tag memory read prohibiting signal TRCancel becomes low level (state where reading is allowed). Consequently, the second read signal TRead2 becomes high level, reading of the tag memory 22 is performed, and hit determination is effected by the hit determining portion 23. In the example in FIG. 6, the hit determining signals THit, THit2 both become high level and it is detected that the data to be accessed are held in the data memory 30. At this time, the valid data bits VB1, 2, 3 are held in the holding portion 50. The valid data bits VB1, 2, 3 at this time are "111".

Next, when the internal address is incremented and becomes the n+4 address, the tag memory read prohibiting signal TRCancel (=H, state where reading is prohibited) is generated by the determining circuit 40 because the increment signal PLUS4 is high level and the signal SLine becomes high level. As a result, the second tag memory read signal TRead2 becomes low level and reading of the tag memory 22 is prohibited. This yield Thit=L. Meanwhile, in the cache hit determination, the valid data bit VB1 corresponding to the address n+4 is 1 and therefore the current valid data bit VNow that is output from the selecting circuit 60 also becomes high level. The output of the AND gate 47 becomes high level, and the hit determining signal THit2 (=H) indicating a cache hit is generated. As a result, data in the data memory 30 are accessed, and access of external memory 10 is not performed. That is, the cache hit determination is performed according to the valid data bits VB1–3. Likewise, when the internal address IA is incremented and becomes the n+8, n+c addresses, the same operations as above are performed.

Next, when the internal address IA is incremented and becomes the n+10 address, the internal address IA [3:2]=00 so that the signal SLine becomes low level. In effect, the address to be accessed becomes an address that is controlled by different address information in tag memory from the preceding access, so that the tag memory read prohibiting signal TRCancel becomes low level (state where reading is allowed). Consequently, according to the read signal TRead, the second read signal TRead2 becomes high level, tag memory 22 is read, and hit determination is performed. In this example, the determining signal THit becomes high level and the internal data memory 22 is accessed. At the same time, the valid data bits VB1, 2, 3 are held in the data bit holding portion 50 according to Tread2=H.

Next, when the internal address IA jumps to the address m according to a jump command, the increment signal PLUS4 becomes low level so that the tag memory read prohibiting signal TRCancel becomes low level (state where reading is allowed). Consequently, according to the read signal Tread (H level due to access), the second read signal TRead2 becomes high level, the tag memory 22 is read, and hit determination is performed. In this example, the hit determining signal THit becomes low level (cache miss) and the external main memory 10 is accessed. Access to the external main memory 10 requires a longer time than access to the internal data memory 22 as indicated in FIG. 6. While the main memory 10 is accessed and those data are supplied to the integer unit IU, those data are written to the internal data memory 30 and the upper addresses for the corresponding data are written to tag memory 22, and the valid data bit VB is updated to "0001".

Next, when the address becomes m+4, the reading of the tag memory 22 is prohibited due to Sline=H and the valid data bit VB1 that is stored is then referenced. Because VB1=0, the current valid data bit VNow becomes low level. Consequently, the second hit determination signal THit2 becomes L level, a cache miss, the external main memory 10 is accessed, and those data are stored in the internal data memory 30 while the current valid data bit VB1 is updated to 1.

The same operations are performed for the next addresses m+8 and m+c; reading of the tag memory 22 is prohibited and the cache hit determination is performed according to the valid data bit VB1–3 that is stored in the valid data bit holding portion 50.

As above, in the second embodiment, and in the case of accessing to data controlled by the same address information in tag memory, reading of the tag memory is prohibited and the hit determination is performed according to the valid data bit. For this reason, the valid data bit is stored in the portion 50 when the tag memory is read.

Figure 7:
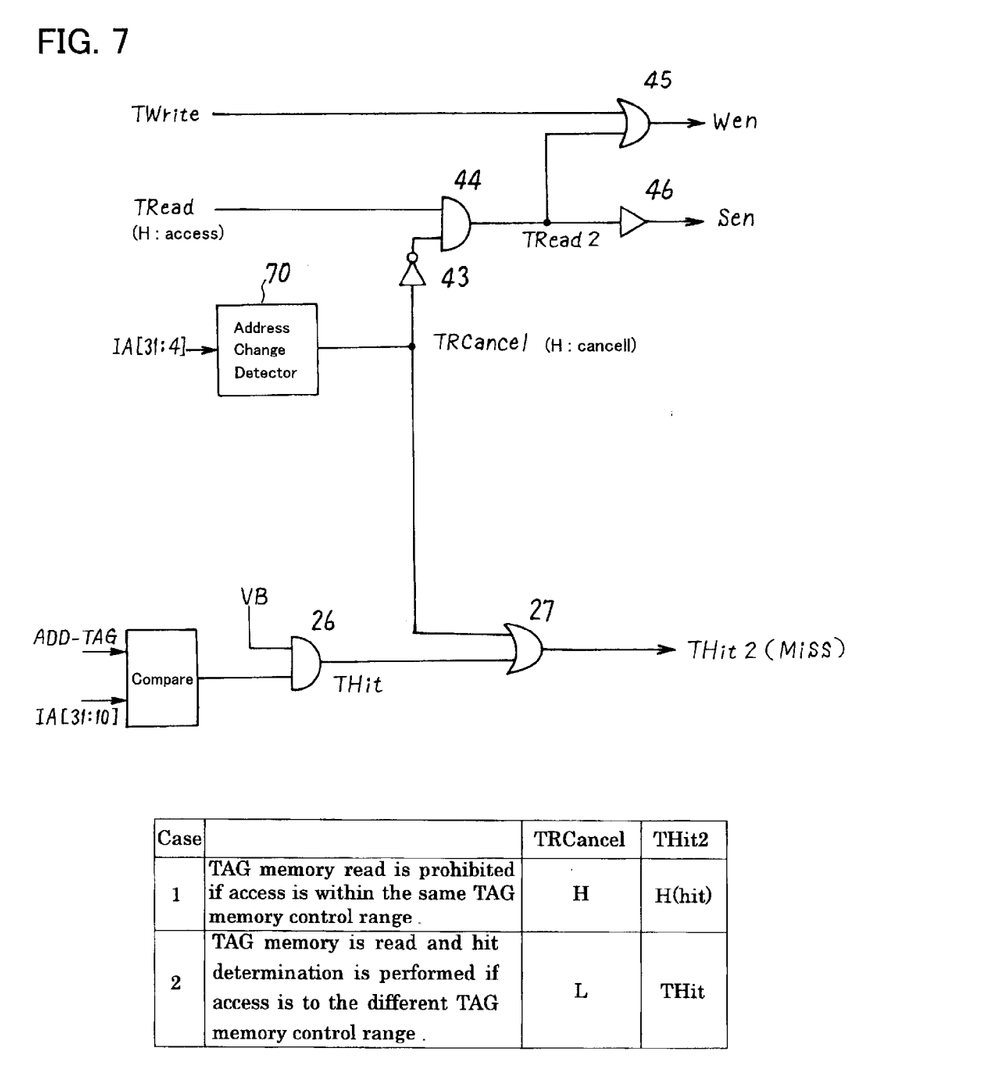
FIG. 7 is a drawing showing the cache controller relating to a third embodiment.

FIG. 7 is a drawing of the cache controller in a third embodiment. In this example, the valid data bit VB comprises one bit and four words of data are transferred and sent in block from the external memory 10 to the internal data memory 30. The third embodiment differs from the first embodiment in that it has an address change detecting circuit 70 established instead of the determining circuit 40. The address change detecting circuit 70 compares the current address to be accessed IA [31:4] to the previous address to be accessed IA [31:4]. If these match, this circuit determines that access is within the range controlled by the same address information in tag memory and sets the tag memory read prohibiting signal TRCancel to high level. Otherwise the constitution is the same as the first embodiment shown in FIG. 3 and operations are also the same.

Figure 8:
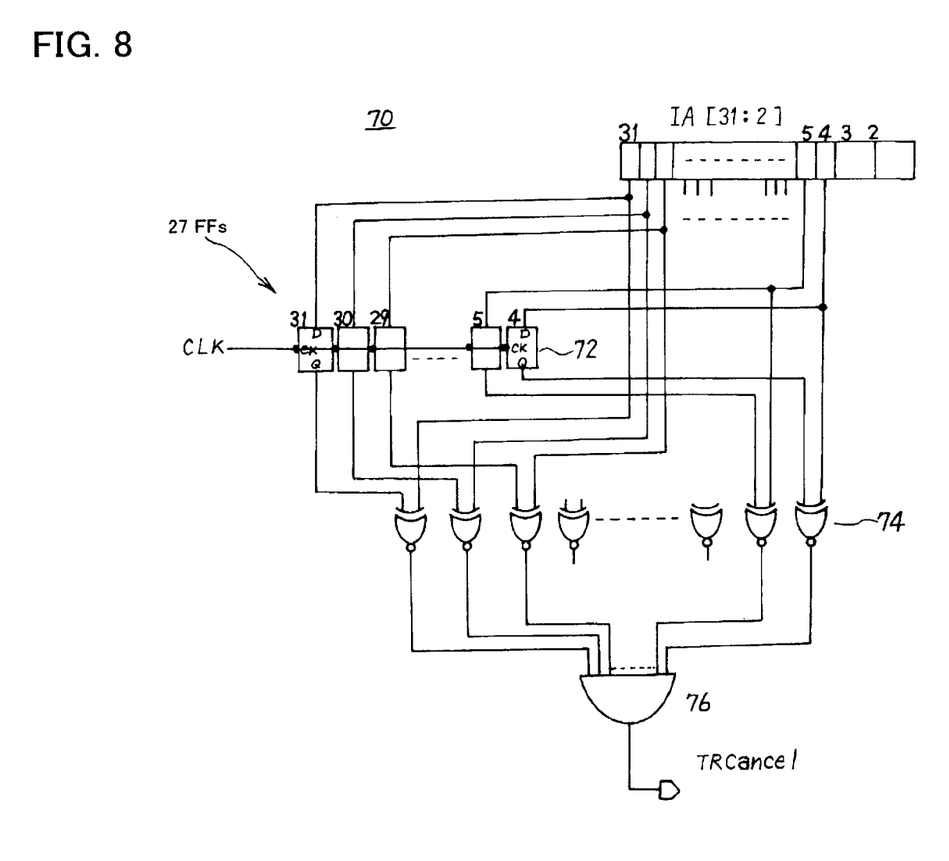
FIG. 8 is a drawing showing the constitution of the address change detecting circuit 70.

FIG. 8 is a drawing of the constitution of the address change detecting circuit 70. The internal address IA [31:4], excluding the IA [3:2] for selecting the valid data bit from the internal address IA [31:2], is latched by a delay flip-flop group 72 in synchronized with the clock CLK. The next internal address IA [31:4] to be accessed and the previous internal address IA [31:4] latched by the delay flip-flop group 72 are compared with the ENOR gate group 74; if they match, the output TRCancel of the AND gate 76 becomes high level. In effect, this address change detecting circuit 70 detects the access to the four word data group that is the same as the previous access. In this case, the initial access of the four words of data has been performed and the four words of data have been transferred in a group from the external memory 10 to the internal memory 30, or are already contained within the internal memory 30; therefore, a cache hit (THit2=H) is forcibly determined without reading the tag memory 22.

In the third embodiment, the previous address and the current address are compared and it is determined whether access is to four words of data that are controlled by the same address information in tag memory. In the case where initial access of the four words of data is performed, tag memory is read and a hit determination is performed. If a cache hit is determined, the internal memory 30 is accessed. If a cache miss, the external memory 10 is accessed and the four words of data are transferred to the internal memory 30 while the tag memory 22 is rewritten and the valid data bit VB is updated. Next, when the same four words of data are accessed, because those four words of data have already been transferred to the internal data memory 30, the tag memory 22 is not read and a cache hit determination is not performed again.

Figure 9:
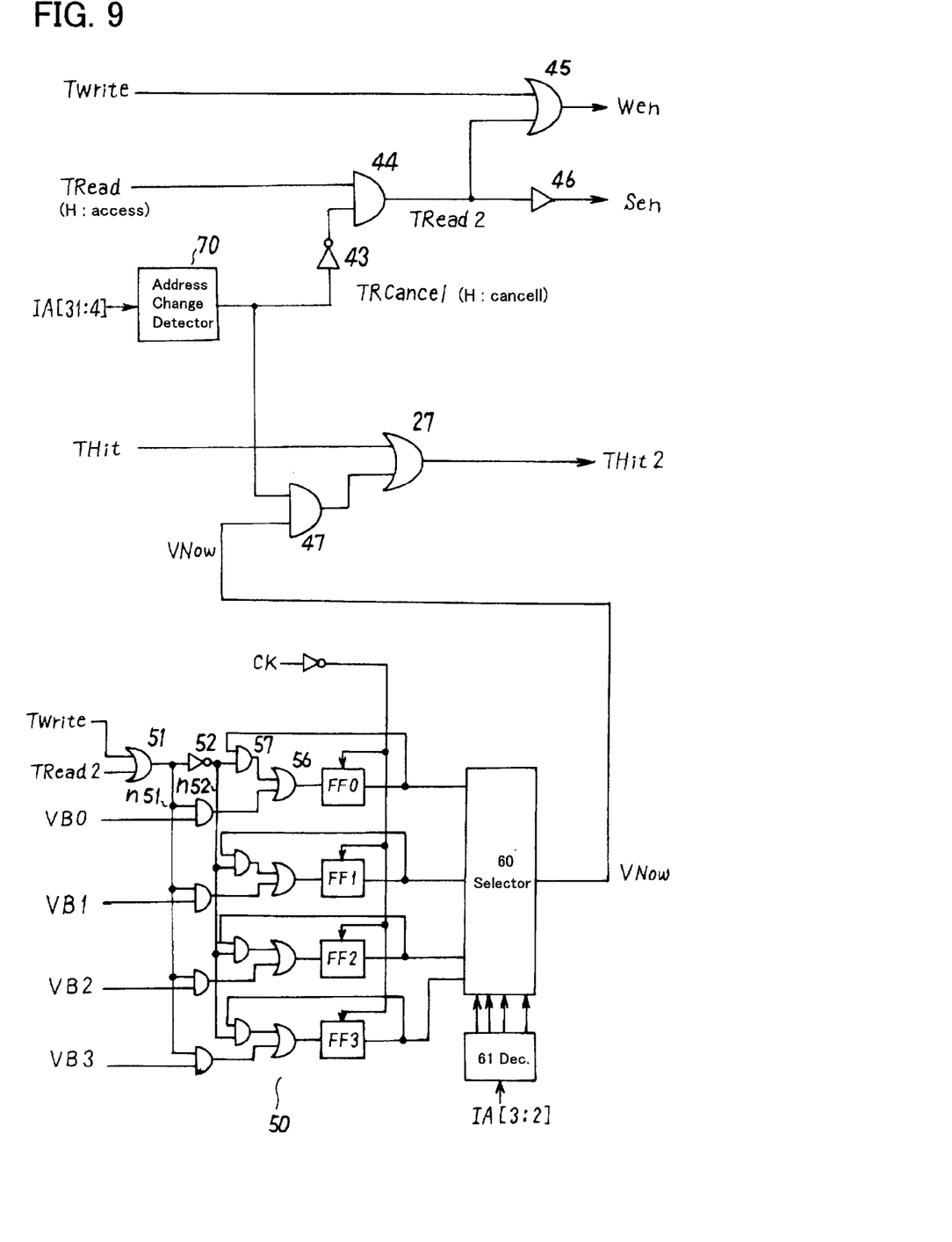
FIG. 9 is a drawing showing the cache controller relating to a fourth embodiment.

FIG. 9 is a drawing of the cache controller in a fourth embodiment. Like the second embodiment, this example has the valid data bit VB comprising four bits and the four words of data are transferred and sent from the external memory 10 to the internal data memory 30 in units of one word.

In the cache controller in FIG. 9, the address change detecting circuit 70 generates the tag memory read prohibiting signal TRCancel, unlike the second embodiment shown in FIG. 5. The address change detecting circuit 70 is the same as shown in FIG. 8. Furthermore, with the cache controller in FIG. 9, four flip-flops FF0–FF3 in the holding portion 50 hold all of the four bit valid data bits VB0–3 when the tag memory 22 is read and is written. When the address change detecting circuit 70 does not detect a change in the internal address IA [31:4], a cache hit determination is performed according to the current valid data bit VNow which is selected at the selector 60 according to the access address IA [3:2] from among the stored valid data bits VB0–3, and the second hit signal THit2 is generated via gates 47, 27.

In the third and fourth embodiments, the address change detecting circuit 70 compares the previous and current internal addresses IA[31:4] to determine whether access of the four words of data is repeated. The reading of tag memory is prohibited when the address to be accessed corresponds to any of the same four words of data, in other words, the access is within a range controlled by the same address information in tag memory. Then, in the case where the four words of data have been sent to or transferred from the internal data memory in a block, a hit state (Thit2=H) is forcibly determined by the determination signal TRCancel (=H). Also, in the case where the four words of data are transferred to or sent from the internal data memory by one word at a time, the determination is performed according to the valid data bits VB0–3.

In any case, the read operation of the tag memory is only performed when the four words of data are first accessed and the reading of the tag memory is not repeated when the same four words of data are subsequently accessed.

Normally, when the program stored in the main memory 10 is executed, the integer unit IU accesses the main memory 10, while incrementing the address. Consequently, when the address information in tag memory controls each four words of data, tag memory is read and the hit determination is performed one time among the four accesses and the read operation for tag memory is prohibited three times among the four accesses. Also, when access to another four words of data is requested by jumping the program address, the tag memory is read and a hit determination is performed.

Furthermore, in the cache system, when there is an access request from the integer unit IU, the tag memory 22 and the internal data memory 30 are both accessed at the same time for the purpose of its high-speed operations. In that case, since the hit determination is performed without reading tag memory in the present embodiment, the hit determination is completed in a short period of time. Consequently, in the case where a cache miss is determined, subsequent read operations of the data memory 30 can be interrupted and the amount of power consumed can be limited by deactivating the sense amplifier enable signal Sen to the data memory 30.

In the present embodiment, address information in tag memory controls the data in units of four words of data, but the present invention is not limited to this and may also be controlled in units of eight words of data or 16 words of data. Also, the number of bits of the upper address stored in tag memory can be changed appropriately.

With the present invention, the address information in tag memory is used for collectively controlling a plurality of data items with consecutive addresses. Wasteful power consumption is prevented by not performing the operation of reading tag memory when the address to be accessed corresponds to the same plurality of data items as the previous address to be accessed.

The scope of the present invention is not limited to the embodiments discussed above and extends to embodiments equivalent to the invention described in the claims.

What is claimed is:

1. A cache system comprising:
   a data memory for holding a part of data stored in an external memory;
   a tag memory holding address information for the data held in the data memory and a valid data bit indicating whether data controlled by the address information is valid, the address information in tag memory commonly controlling a plurality of data items with consecutive addresses; and
   an active cache controller causing a sense amplifier enable signal of said tag memory inactive state to prohibit a reading of said tag memory in a first case where an address to be accessed corresponds to data controlled by the same address information in tag memory as that for a preceding address to be accessed, and allowing the reading of said tag memory and performing a cache hit determination in a second case where said address to be accessed corresponds to data controlled by different address information in tag memory from that for the preceding address to be accessed.

2. The cache system, according to claim 1, wherein said valid data bit comprises one bit in common to said plurality of data items; and said cache controller, in said second case, transfers said plurality of data items to be accessed in block from said external memory to said data memory when a cache miss is determined in cache hit determination, while, in said first case, determines a cache hit regardless of said address information and accesses the data at the address to be accessed in said data memory.

3. The cache system, according to claim 1, wherein said valid data bit comprises a plurality of bits corresponding to said plurality of data items; and said cache controller, in said second case, transfers a part of said plurality of data items to be accessed from said external memory to said data memory and updates the corresponding valid data bit when a cache miss is determined by cache hit determination, while, in said first case, determines a cache hit according to said valid data bit.

4. The cache system, according to claim 3, wherein said cache controller supplies the inactive sense amplifier enable signal for said tag memory to said data memory as well and interrupts an operation of reading the data memory in the case of a cache miss and the first case.

5. The cache system, according to claim 3, wherein in said first case, said cache controller accesses data at the address to be accessed in said data memory if a cache hit is determined, and transfers data to be accessed from said external memory to said data memory and updates the corresponding valid data bit if a cache miss is determined.

6. The cache system, according to claim 5, wherein said cache controller, in said first case, updates said corresponding valid data bit without updating the address information in said tag memory if a cache miss is determined.

7. The cache system, according to claim 5, wherein said cache controller, in said second case, reads and holds the valid data bit in said tag memory and, in the first case subsequent thereto, performs a cache hit determination according to the held valid data bit.

8. The cache system, according to claim 1, wherein the cache controller interrupts the operation of reading said data memory if a cache miss is determined.

9. The cache system, according to claim 1, wherein said cache controller determines said first case in a case where the address to be accessed is incremented from the previous address to be accessed and the address to be accessed is not a lead address of said plurality of data items; and determines said second case in a case where said address to be accessed is not incremented from the previous address to be accessed or the address to be accessed is the lead address of said plurality of data items.

10. The cache system, according to claim 1, wherein said cache controller determines said first case in a case where the address to be accessed and the previous address to be accessed correspond to any of the same plurality of data items; and determines said second case in a case where the address to be accessed and the previous address to be accessed correspond to any of the different plurality of data items.

11. The cache system, according to claim 10, wherein said cache controller compares an upper bits of said address to be accessed and an upper bits of said previous address to be accessed, and determines said first case if they match and determines said second case if they do not match.

12. The cache system, according to any of claims 1 through 3, wherein said tag memory comprises word lines, bit lines, memory cells at the intersections thereof, and a sense amplifier for amplifying the bit lines;

wherein said word lines are driven according to a word line enable signal and said sense amplifier is driven according to a sense amplifier enable signal; and wherein said cache controller puts said word line enable signal and the sense amplifier enable signal in an inactive state in said first case.

13. The cache system, according to claim 12, wherein said cache controller puts the word line enable signal of said tag memory in an inactive state and the sense amplifier enable signal of said tag memory in an active state at a write operation of the tag memory after cache determination in the case of a cache miss.

14. The cache system, according to claim 1, wherein said cache controller supplies the inactive sense amplifier enable signal for said tag memory to said data memory as well and interrupts an operation of reading the data memory in the case of a cache miss and the first case.

15. A system according to claim 1, wherein the tag memory is disabled so that the reading is prohibited.

16. A cache system comprising:

a data memory holding a part of data stored in an external memory;

a tag memory holding address information for the data held in the data memory and a valid data bit indicating whether data controlled by the address information is valid, the address information in tag memory commonly controlling a plurality of data items with consecutive addresses; and a cache controller prohibiting a reading of tag memory in a first case when an address to be accessed corresponds to data controlled by the same address information in tag memory as that for a preceding address to be accessed, and allowing the reading of said tag memory and performing a cache hit determination in a second case where said address to be accessed corresponds to data controlled by different address information in tag memory from that for the preceding address to be accessed, wherein said valid data bit comprises a plurality of bits corresponding to said plurality of data items; and said cache controller, in said second case, transfers a part of said plurality of data items to be accessed from said external memory to said data memory and updates the corresponding valid data bit when a cache miss is determined by cache hit determination, while, in said first case, determines a cache hit according to said valid data bit, wherein in said first case, said cache controller accesses data at the address to be accessed in said data memory if a cache hit is determined, and transfers data to be accessed from said external memory to said data memory and updates the corresponding valid data bit if a cache miss is determined, and wherein said cache controller, in said first case, updates said corresponding valid data bit without updating the address information in said tag memory if a cache miss is determined.

17. A cache system comprising:

a data memory holding a part of data stored in an external memory;

a tag memory holding address information for the data held in the data memory and a valid data bit indicating whether data controlled by the address information is valid, the address information in tag memory commonly controlling a plurality of data items with consecutive addresses; and a cache controller prohibiting a reading of tag memory in a first case when an address to be accessed corresponds to data controlled by the same address information in tag memory as that for a preceding address to be accessed, and allowing the reading of said tag memory and performing a cache hit determination in a second case where said address to be accessed corresponds to data controlled by different address information in tag memory from that for the preceding address to be accessed, wherein said valid data bit comprises a plurality of bits corresponding to said plurality of data items; and said cache controller, in said second case, transfers a part of said plurality of data items to be accessed from said external memory to said data memory and updates the corresponding valid data bit when a cache miss is determined by cache hit determination, while, in said first case, determines a cache hit according to said valid data bit, wherein in said first case, said cache controller accesses data at the address to be accessed in said data memory if a cache hit is determined, and transfers data to be accessed from said external memory to said data memory and updates the corresponding valid data bit if a cache miss is determined, and wherein said cache controller, in said second case, reads and holds the valid data bit in said tag memory and, in the first case subsequent thereto, performs a cache hit determination according to the held valid data bit.

18. A cache system comprising:

a data memory holding a part of data stored in an external memory;

a tag memory holding address information for the data held in the data memory and a valid data bit indicating whether data controlled by the address information is valid, the address information in tag memory commonly controlling a plurality of data items with consecutive addresses; and a cache controller prohibiting a reading of tag memory in a first case when an address to be accessed corresponds to data controlled by the same address information in tag memory as that for a preceding address to be accessed, and allowing the reading of said tag memory and performing a cache hit determination in a second case where said address to be accessed corresponds to data controlled by different address information in tag memory from that for the preceding address to be accessed, wherein said valid data bit comprises a plurality of bits corresponding to said plurality of data items; and said cache controller, in said second case, transfers a part of said plurality of data items to be accessed from said external memory to said data memory and updates the corresponding valid data bit when a cache miss is determined by cache hit determination, while, in said first case, determines a cache hit according to said valid data bit, and wherein said cache controller, in said first case, updates said corresponding valid data bit without updating the address information in said tag memory if a cache miss is determined.

19. A cache system comprising:

a data memory holding a part of data stored in an external memory;

a tag memory holding address information for the data held in the data memory and a valid data bit indicating whether data controlled by the address information is valid, the address information in tag memory commonly controlling a plurality of data items with consecutive addresses; and a cache controller prohibiting a reading of tag memory in a first case when an address to be accessed corresponds to data controlled by the same address information in tag memory as that for a preceding address to be accessed, and allowing the reading of said tag memory and performing a cache hit determination in a second case where said address to be accessed corresponds to data controlled by different address information in tag memory from that for the preceding address to be accessed, wherein said valid data bit comprises a plurality of bits corresponding to said plurality of data items; and said cache controller, in said second case, transfers a part of said plurality of data items to be accessed from said external memory to said data memory and updates the corresponding valid data bit when a cache miss is determined by cache hit determination, while, in said first case, determines a cache hit according to said valid data bit, and wherein said cache controller, in said second case, reads and holds the valid data bit in said tag memory and, in the first case subsequent thereto, performs a cache hit determination according to the held valid data bit.

* * * * *